United States Patent [19]
Schroder

[11] Patent Number: 4,939,634
[45] Date of Patent: Jul. 3, 1990

[54] GROUP CONTROL OVERLOAD PROTECTION FOR ELEVATORS WITH IMMEDIATE ALLOCATION OF CALLS OF DESTINATION

[75] Inventor: Joris Schroder, Lucerne, Switzerland

[73] Assignee: Inventio AG, Switzerland

[21] Appl. No.: 224,760

[22] Filed: Jul. 27, 1988

[30] Foreign Application Priority Data

Jul. 28, 1987 [CH] Switzerland ........................ 02873/87

[51] Int. Cl.[5] ........................... B66B 1/00; G05B 1/00; G06C 3/00

[52] U.S. Cl. ..................................... 364/141; 187/121; 187/124; 187/127; 187/130; 187/131

[58] Field of Search ............... 187/121, 124, 127, 130, 187/131, 133; 364/141

[56] References Cited

U.S. PATENT DOCUMENTS 4,030,572 6/1977 Kaneko ............................... 187/125
4,411,337 10/1983 Schroder ............................. 187/127
4,662,479 5/1987 Tsuji .................................... 187/131

*Primary Examiner*—Jerry Smith
*Assistant Examiner*—James P. Trammell
*Attorney, Agent, or Firm*—Marshall & Melhorn

[57] ABSTRACT

A group control for an elevator system, in which it is possible to assign a newly entered floor call to a car for the first time, immediately and finally, includes a computer and a comparator circuit for calculating operating costs and assigning the call to the car with the lowest cost during a comparison cycle. The operating cost includes car load values for the floors which are stored in a load table for the assigned car. Upon the assignment of a floor call, the load value for the call input floor is increased proportionally to the number of entered calls and the load values at the floors of destination are reduced proportionally to the number of calls for the respective floor of destination. These load values are used by a monitoring circuit to prevent the assignment of a call which would cause an overload condition.

8 Claims, 2 Drawing Sheets

GROUP CONTROL OVERLOAD PROTECTION FOR ELEVATORS WITH IMMEDIATE ALLOCATION OF CALLS OF DESTINATION

BACKGROUND OF THE INVENTION

The invention relates in general to a group control for elevators and, in particular, to a group control with protection against overload during immediate allocation of calls of destination.

Many known elevator group control systems include call registering devices arranged on the floors, by means of which calls for desired floors of destination can be entered. The entered calls are stored in floor and car call memories assigned to the elevators of the group where a call characterizing the entry floor is stored in the floor call memory and the calls characterizing the destination floors are stored in the car call register memory. Selectors assigned to each elevator of the group indicate the floor of a possible stop. First and second scanners are assigned to each elevator of the group. The first scanner operates during a cost of operation calculation cycle to store for each floor the costs in a cost memory. The second scanner operates during a cost comparison cycle of the costs for all elevators by means of which the entered call is assigned to the car of the elevator group which exhibits the lowest operating costs.

Such a group control is shown in the European patent application no. EP-A 0 246 395 where the assignments of the cars to the entered calls can be optimized in time. The car call memory of an elevator of this group control consists of a first memory containing assigned destination floor calls and additional memories assigned to the floors, in which the desired floor calls entered at the respective floors, but not yet assigned to a car, are stored. A device, by means of which the entered calls are assigned to the cars of the elevator group, includes a computer in the form of a microprocessor and a comparator device. The computer calculates at each floor, during a scanning cycle of a first scanner, from at least the distance between the floor and the car position indicated by a selector, intermediate stops to be expected within this distance and the load in the car, a sum proportional to the time losses of waiting passengers at the floors and in the car. The car load present at the time of calculation is corrected by factors which correspond to the expected numbers of entering and exiting passengers at future intermediate stops and which have been derived from numbers of passengers entering and exiting in the past. If the first scanners encounter a not yet assigned floor call, then the calls entered at this floor for desired floors of destination, stored in the further memories of the car call memory, are also taken into account. A sum proportional to the new floor calls is therefore determined and a total sum is formed. This total sum, also termed cost of operation, is stored in a cost memory by floor. During a scanning cycle of a second scanner, the operating costs of all elevators are compared with each other by means of the comparator device. An assignment command is stored in an assignment register of the elevator with the lowest operating cost, which designates that floor to which the respective car is optimally assigned in time.

Since, in above described control, the factors on which the calculation of the cost of operation is based are only probable numbers of entering and exiting passengers, which moreover present different values for each elevator of the group, the assignment procedure can lead to inaccurate results. The sum proportional to the time loss of the passengers in the car, also called the internal cost of operation, is used in this control for the determination of a future overload, so that the assignment of a call to the respective car can be prevented promptly. Thus, it is possible that due to the factors used in the calculation of the internal cost of operation, wrong decisions can occur in the assignment of floor calls.

SUMMARY OF THE INVENTION

The above described problem is solved by the present invention which includes a load table for each elevator. Load values corresponding to the loads in the car are stored in the associated load table which is connected with the computer and the car call memory. On entering of calls and their storage in the car call memory, the load values are increased at the input floor proportionally to the number of the entered calls and at floors of destination decreased proportionally to the number of calls for the respective floor of destination. The load values stored in the load table are given consideration in the calculation of the cost of operation. A monitoring circuit is provided for preventing the assignment of a call to a car which assignment would cause an overload.

The advantages obtained by the present invention are that loads caused by future entering and exiting passengers can be detected more precisely by means of the load table. The load table defines three columns which makes it possible to detect all future loads which are caused by entering and exiting calls of arbitrary location and direction with respect to the car. Thereby it is possible, especially in elevators with immediate allocation of floor calls, to further reduce the average waiting times of all passengers. Another advantage is that through the more precise detection of future overloads, wrong allocations or assignments and the unnecessary stops resulting therefrom can be avoided with greater certainty.

BRIEF DESCRIPTION OF THE DRAWINGS

These and other objects and advantages of the present invention will be apparent to those skilled in the art in the light of the present disclosure including the drawings, in which.

DESCRIPTION OF THE PREFERRED EMBODIMENT

Figure 1:
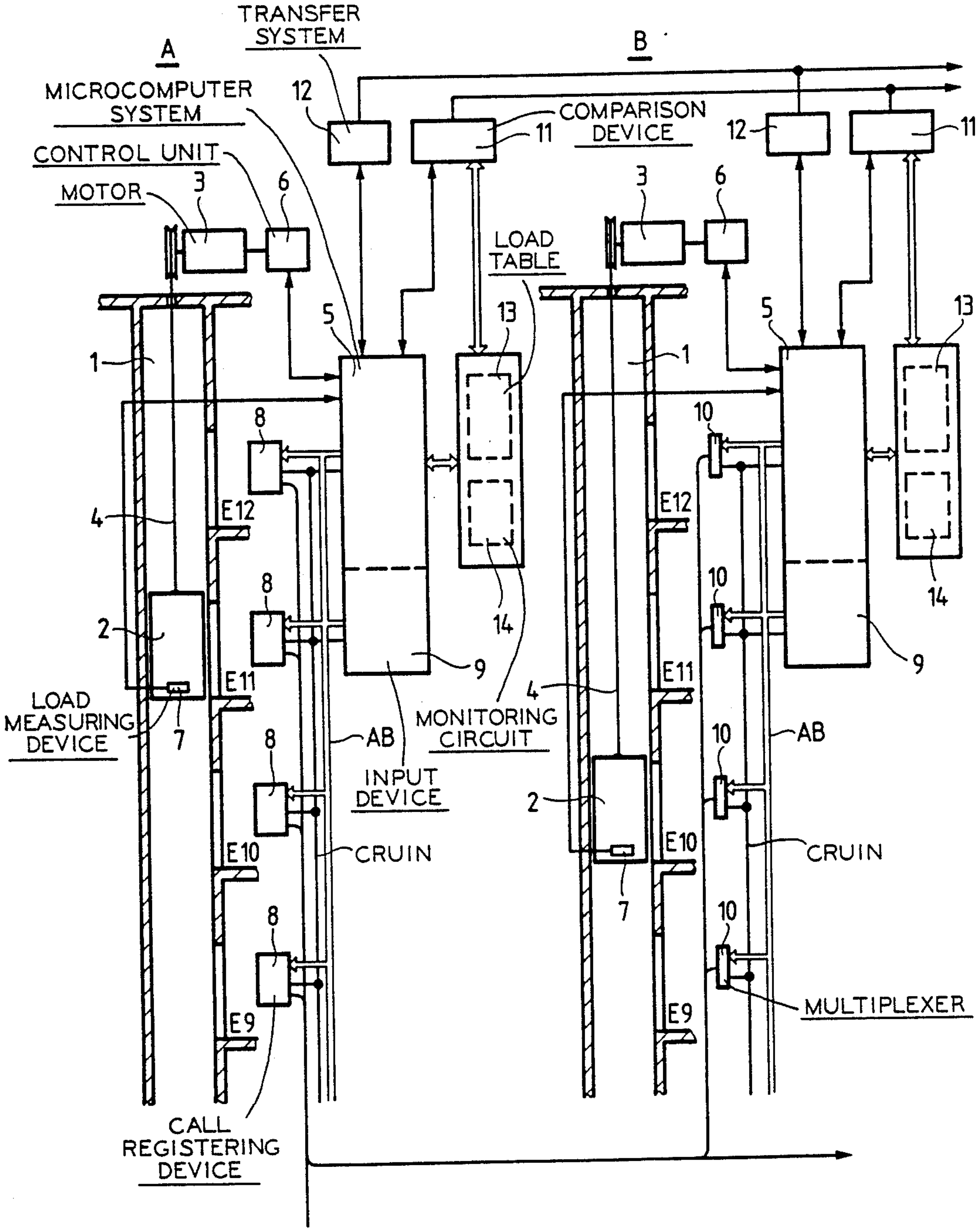
FIG. 1 is a schematic representation of a group control according to the present invention showing two elevators of an elevator group.

Designated with A and B in FIG. 1 are two elevators of an elevator group, each having an elevator car 2 guided in an elevator shaft 1 and driven by a hoist motor 3 by way of a hoisting cable 4. Each elevator car 2 serves, for example, thirteen floors E0 to E12 with only the top four floors being shown. The hoist motor 3 is controlled by a control system, such as is shown in the European patent no. EP-B 0 026 406, where the generation of the nominal or set point values, the control functions and the stop initiation are realized by means of a microcomputer system 5, which is connected with a control unit 6 of the drive control system. The microcomputer system 5 calculates from elevator parameters a sum corresponding to the average waiting time of all passengers, also termed operating costs, which forms the basis of the call assignment process. The car 2 includes a load measuring device 7, which is likewise connected with the microcomputer system 5, for determining when passengers enter and leave the elevator car.

Provided at the floors are call registering devices 8 in the form of ten key keyboards, by means of which floor calls for trips to desired floors of destination can be entered. The call registering devices 8 are connected with the microcomputer system 5 and an input device 9, shown in the European patent no. EP-B 0 062 141, by way of an address bus AB and a data input conductor CRUIN. The call registering devices 8 can be assigned to more than one elevator group. For example, those of the elevator A are in connection by way of coupling elements in the form of multiplexers 10 with the microcomputer system 5 and the input device 9 of the elevator B. The microcomputer systems 5 of the individual elevators of the group are connected together by way of a comparison device 11, shown in the European patent no. EP-B 0 050 304, and by way of a party-line transfer system 12, shown in the European patent no. EP-B 0 050 305, and form, together with the call registering devices 8 and the input devices 9, a group control, which structurally conforms to the group control described in the European patent application no. EP-A 0 246 395.

Designated with 13 is a load table and with 14 is a monitoring circuit, which are connected to each other and with components of the microcomputer system 5 and which will be explained in more detail in the following with the aid of FIGS. 2 and 3.

Figure 2:
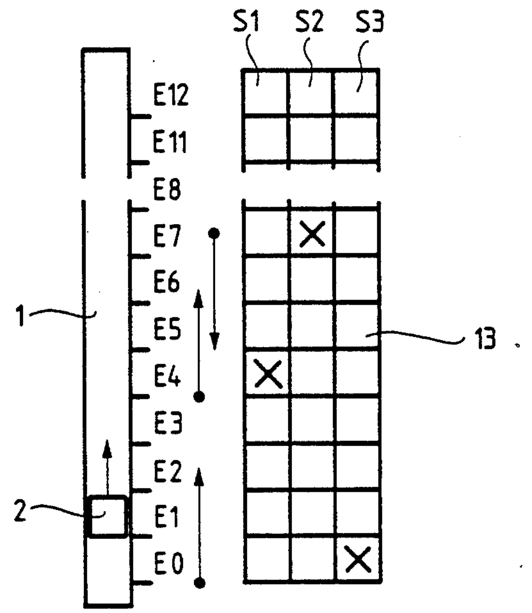
FIG. 2 is a schematic representation of a load table of the group control according to FIG. 1.

The load table 13 consists, according to FIG. 2, of a write-read memory in the form of a matrix having exactly as many lines or rows as floors and three columns S1, S2, S3. The first column S1 of the matrix is assigned to the calls lying in the same direction of travel and ahead of the car 2. The second column S2 is assigned to the calls in the opposite direction and the third column S3 is assigned to the calls in same direction of travel but lying behind the car 2. Stored in the memory locations of the load table 13 are load values in the form of numbers of persons which are present in the car 2 on leaving or passing each floor.

For example, it is assumed in FIG. 2 that the car 2 is loaded for upward travel at the floor E1. At each of the floors E0 and E4, an upward call "X" is entered and, at the floor E7, a downward call "X" is entered. As described in more detail in the following, the load values of the memory locations assigned to the entering floors and the destination floors are changed when a call is entered. In FIG. 2, only the memory locations assigned to the entering or input floors are characterized with an "X". In the calculation of the operating costs, the control reviews the total load range possible for an elevator so that precise allocation decisions can be made.

Figure 3:
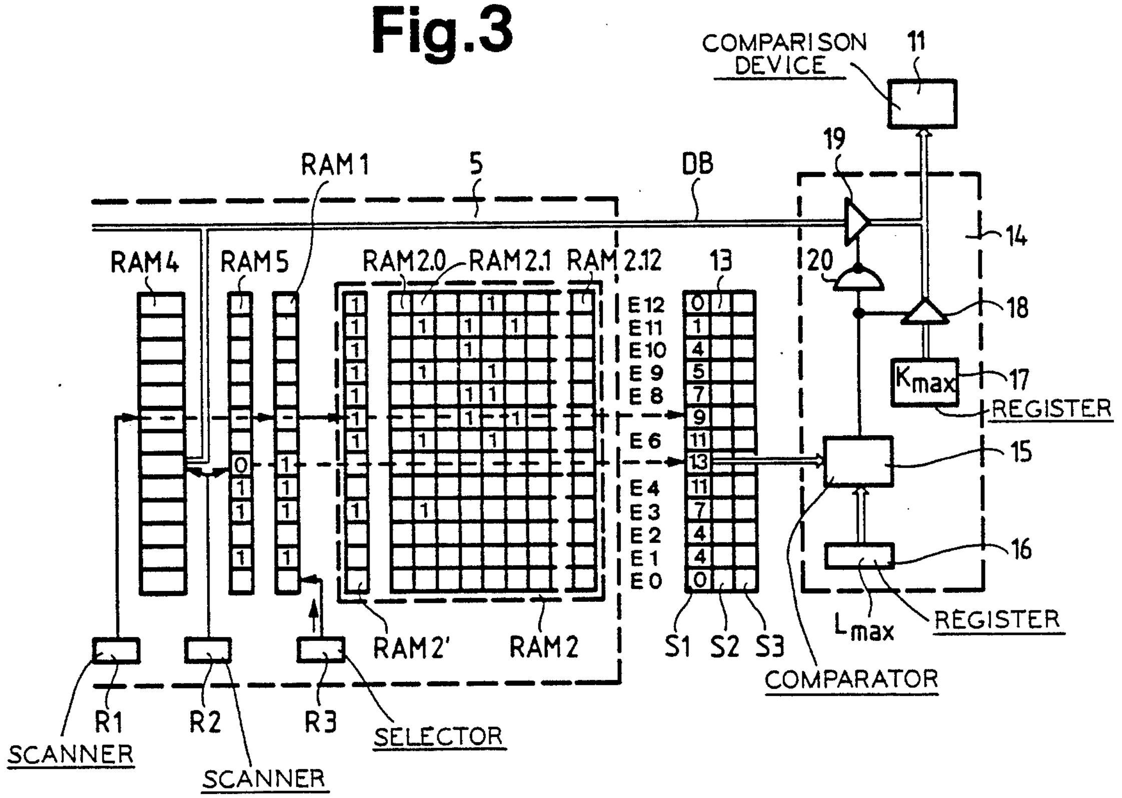
FIG. 3 is a schematic representation of a portion of a computer and a monitoring circuit of the group control according to FIG. 1.

According to FIG. 3, the monitoring circuit 14 includes a comparator 15, a first register 16 containing a load limit value "$L_{max}$", a second register 17 containing a maximum value for operating costs "$K_{max}$", first and second tristate buffers 18 and 19, and a NOT-gate 20. Inputs of the comparator 15 are connected with an output of the load table 13 and an output of the first register 16. An output of the comparator 15 is connected with a control input of the first tristate buffer 18 and through the NOT-gate 20 with a control input of the second tristate buffer 19. The second register 17 has an output connected through the first tristate buffer 18 with the data inputs of the comparison device 11. The data bus DB of the microcomputer system 5 is connected through the second tristate buffer 19 to the data inputs of the comparison device 11. The monitoring circuit 14, which for example can be formed by means of the microprocessor of the microcomputer system 5, is activated in every position of a scanner scanning the load table 13.

The microcomputer system 5 is partially shown schematically in FIG. 3, and includes, according to the above cited European patent application no. EP-A 0 246 395, a floor call memory RAM1, a car call memory RAM2, a cost memory RAM4, an assignment memory RAM5, a first and second scanner R1 and R2, and a selector R3. The car call memory RAM2 includes a first register RAM2', which has storage locations corresponding to the number of floors, in which already assigned calls are stored. The car call memory RAM2 also includes registers RAM2.0 through RAM2.12, associated with the floors E0 to E12 respectively, which likewise have storage locations corresponding to each of the floors into which the calls entered at the respective floors are transferred which are not yet assigned to a certain car. In this way, the destination floor calls entered on the floor E1 for the floors E3, E6, E9 and E11, according to the example of FIG. 3, are transferred into the register RAM2.1, where at the same time an entry floor call for floor E1 is stored in the floor call memory RAM1. Corresponding to the customary logical symbolism, the stored calls in FIG. 3 are characterized with a "1".

The mode of operation of the group control described in the preceding will be explained in more detail with the aid of the FIGS. 2 and 3. Upon the entering of floor calls, all of the load tables of all of the elevators are set up. This is done in such a way that, after transfer of the calls into the floor call memory RAM 1 and the registers RAM 2.0 through RAM 2.12, a sum is formed from the number of calls entered at a floor (entering passengers) and the number of calls designating this floor as a destination of travel (exiting passengers). The sum is stored as load value in the load table 13. According to the example presented in FIG. 3, for elevator A assume upward calls for the floors E3 and E6 to E12 are entered on the floors El (RAM2.1), E3 (RAM2.3), E4 (RAM2.4) and E5 (RAM2.5) where the car, according to the position of the selector R3, is located at the floor E0. The first column S1 of the load table 13 shows, on the basis of the numbers of entering and exiting passengers, the stored load values from zero through thirteen. There results at the floor E4, for example, from four entering passengers on the floors E1, E3, E4 and one exiting passenger on floor E3 the load value "11".

After setting up the load tables 13, there takes place the calculation of the operating costs. As described in the European patent application no. EP-A 0 246 395, the calculation cycle is triggered upon input of a floor call and is carried out at each floor designated by the scanner R1 shown in FIG. 3. The formula used and known from the preceding patent application is however modified in such a way that, in place of a car load based on probable future entering and exiting passengers, the load value stored in the load table 13, and in place of the probable future entering passengers, the calls entered at the respective floors are used. The operating costs calculated in this manner are stored in the cost memory RAM 4 of FIG. 3.

As is also shown in the aforementioned patent application, a cost comparison cycle is carried out after the completion of the cost calculation cycle. In this cycle, the operating costs of all the elevators stored in the cost memories RAM 4 at the floors designated in each case by the scanner R2 are compared with each other and the respective call assigned to that car which has the smallest operating costs. The first assignment of a floor call could in each case be the final assignment. Let it now be assumed that the cars 2 are designed for a maximum load of $L_{max}$= twelve persons and that the scanner R2, during the comparison of floor E5 for the elevator A. encounters a load value of thirteen persons. The load value is fed to the comparator 15 and compared with the load limit value $L_{max}$ stored in the first register 16. At $L_{max}$, the comparator 15 generates a signal so that the first tristate buffer 18 is activated and the second tristate buffer 19 is deactivated. At floor E5, the operating costs stored in the cost memory RAM 4 of the elevator A are not transferred, but the maximum operating costs $K_{max}$ stored in the second register 17 are transferred into the comparison device 11. On comparison, it is therefore established that the elevator A has the largest operating costs so that, as is known from the European patent no. EP-B 0 050 304, an assignment command Co ="1" is written in its assignment memory RAM 5, whereby the call from the floor E5 is considered as not assigned. At Co ="0", the microprocessor of the elevator A will cancel the portion of the load value due to the not assigned call from the load table 13. The calls from the floors E1, E3 and E4 are assigned to the elevator A by the writing of assignment commands Co ="1" into the assignment memory RAM 5 assigned to the elevator A, whereby a correction of the load tables 13 of the remaining elevators of the group, due to Co ="0", will be brought about.

As described in the preceding, in setting up the load table 13, conclusions are reached from the entered calls about the entering and exiting passengers in the future and the loads generated thereby in the car 2. However, it is possible that passengers entered their call more than once, or that passengers who have not entered a call board the car. In these cases, the stored load values have to be corrected. For this purpose the load table 13 is connected with the load measuring device 7 of the car 2 by way of the microcomputer system 5. In the first case, so many of the identical calls of destination are cancelled at the respective floor as corresponds to the difference between the stored load value and the actually measured car load. After this, all stored load values between the floor of entry and the floor of destination of the call entered more than once will be corrected. In the second case, the stored load values have to be increased, where it is assumed that the passenger who has not entered a call would like to travel to a destination which is already represented by a call entered by another passenger. If several calls have been entered, it is assumed that the new passenger wants to travel to the most remote destination.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An improvement in a group control for elevators having at least two elevator cars for serving a plurality of floors and for the immediate assignment of floor calls of destination, the group control including ten key keyboard call registering devices arranged at the floors for entering floor calls for desired floors of destination, floor call and car call memories assigned to the cars of the group and connected with the call registering devices where on input of floor calls at a floor, an entry floor call representing the input floor is stored in the floor call memory and destination floor calls representing the floors of destination are stored in the car call memory, load measuring devices provided in the cars, selectors assigned to each car indicating in each case the floor of a possible stop, first and second scanners assigned to each car and having for every floor at least one position, and for each car a computer and a comparison device wherein the computer calculates at each floor designated by the first scanner from at least the distance between the floor and a floor indicated by the selector, the intermediate stops to be expected within this distance, and the load in the car the operating costs corresponding to the waiting times of the passengers, and wherein the operating costs of all cars at every position of the second scanner are compared with each other by the comparison device and the respective cell is assigned to that car which exhibits the smallest operating costs, the improvement comprising:

a load table for storing load values corresponding to the loads in the car and which is connected with the computer and the car call memory and upon input of a floor call at an entering floor and the storage of associated destination floor calls in the car call memory, the load values at the entering floor are increased proportionally to the number of the entered calls and the load values at the floors of destination are reduced proportionally to the number of calls for the respective floor of destination and the computer utilizes the load values stored in the load table in the calculation of the operating costs and includes a cost memory for storing the calculated operating costs; and a monitoring circuit connected with said load table and responsive to the existence of a load value exceeding a given load limit value for preventing an assignment to the respective car of a call causing an overload, said monitoring circuit including a comparator, a first register containing a load limit value ($L_{max}$), a second register containing a maximum value of the operating costs ($K_{max}$), first and second tristate buffers and a NOT-gate, inputs of the comparator are connected to outputs of said load table and said first register and an output is connected to a control input of said first tristate buffer and through said NOT-gate with a control input of said second tristate buffer, and said second register is connected through said first tristate buffer with data inputs of the comparison device are also connected through said second tristate buffer to a data bus of the computer and at every position of the second scanner said monitoring circuit is activated and in case of an overload at a floor, the maximum value of the operating costs ($K_{max}$) contained in the second register is generated to the comparison device instead of the operating costs stored in said cost memory.

2. The improvement according to claim 1 wherein said load table includes a write-read memory in the form of a matrix having as many lines as floors and three columns defining a plurality of storage locations.

3. The improvement according to claim 2 wherein said three columns include a first column for calls in the direction of travel and lying ahead of the car, a second column for calls in an opposite direction of travel, and a third column for calls in the direction of travel and lying behind the car.

4. The improvement according claim 1 wherein said load values stored in said load table represent numbers of passengers.

5. The improvement according to claim 1 wherein said load table is connected with the load measuring device of the car and at differences between the stored load values and measured loads, the stored load values are matched to the measured loads and for positive differences a corresponding number of calls to the same floors of destination are cleared.

6. A group control for elevators having at least two cars for serving a plurality of floors and for the immediate assignment of floor calls of destination, comprising:

call registering devices at each floor for entering floor calls for desired floors of destination;

a floor call memory for each car for storing a floor call for a floor of entry;

a car call memory for each car for storing destination floor calls from said floor of entry;

a load measuring device associated with each car for indicating the number of passengers;

a selector for each car for indicating the floor at which the car can stop;

first and second scanners for each car having a position for each floor;

a computer for each car connected to said call registering devices and to the computers for the other cars and connected to said floor call memory, said car call memory, said load measuring device, said selector, and said first and second scanners for an associated car and responsive to said first scanner for calculating for each floor the operating costs corresponding to the waiting times of any passengers;

a comparison device for each car connected to said computer associated with the car for comparing the operating costs of all the cars at every floor designated by said second scanner to assign the floor call to the car with the smallest operating costs;

a load table for each car connected to said computer associated with the car for storing load values representing the number of passengers in the car and responsive to the input of floor calls and the storage of said destination floor calls in said car call memory for increasing the load value for the floor of entry proportionally to the number of entered destination floor calls and for decreasing the load values at the floors of destination proportionally to the number of calls for the respective floor, said computer utilizing said load values in calculating said operating costs; and a monitoring circuit for each car connected to said comparison device and to said load table for the associated car and responsive to one of said load values exceeding a predetermined load limit value for preventing the assignment of the floor call to the associated car, said monitoring circuit including a first register for storing a load limit maximum value, a second register for storing an operating costs maximum value, a comparator having inputs connected to an output of said load table and to an output of said first register and an output connected through a Not-gate to a control input of a first tristate buffer and to a control input of a second tristate buffer, said first tristate buffer having an input connected to said computer and an output connected to said comparison device, and said second tristate buffer having an input connected to an output of said second register and an output connected to said comparison device.

7. The group control according to claim 6, wherein said load table is a write-read memory formed as a matrix of storage locations having three storage locations for each floor served by the cars.

8. The group control according to claim 7 wherein said three storage locations include a first location for calls in the direction of travel and ahead of the associated car, a second location for calls in the opposite direction of travel, and a third location in the direction of travel and behind the associated car.

* * * * *